Feb. 19, 1963 V. A. BALKO ET AL 3,077,998
BOAT TRAILER CONSTRUCTION
Filed Aug. 19, 1960 2 Sheets-Sheet 1
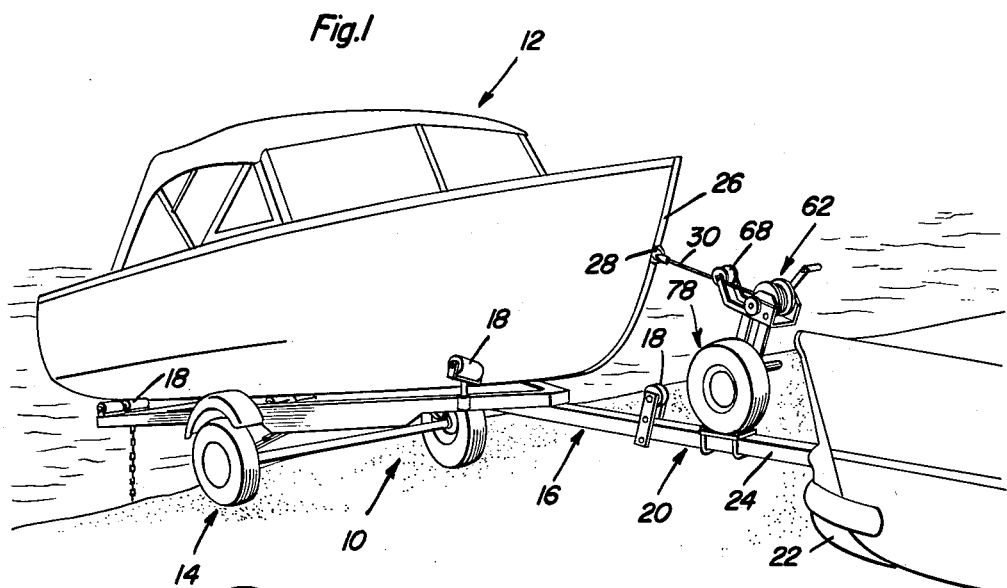
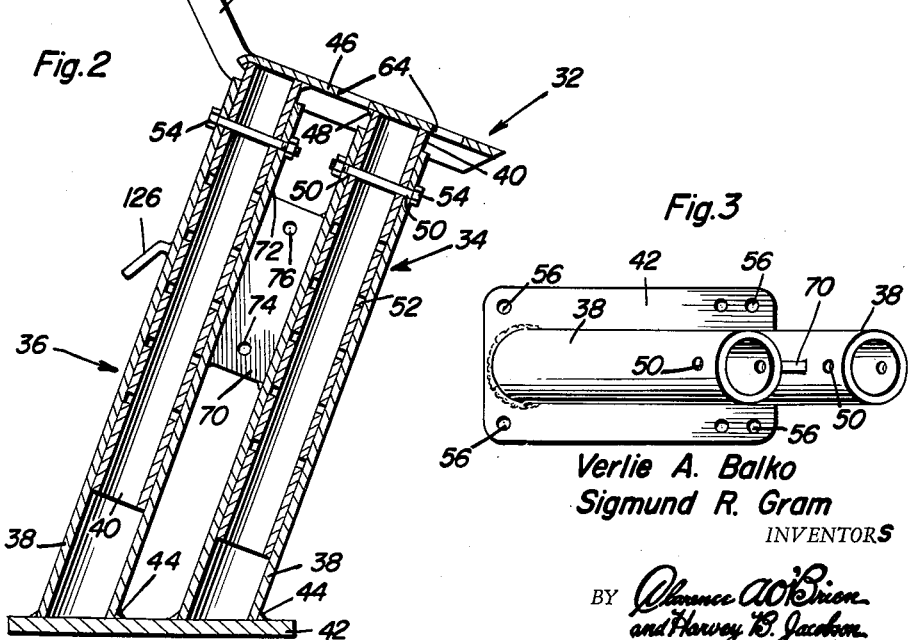
Verlie A. Balko
Sigmund R. Gram
INVENTORS

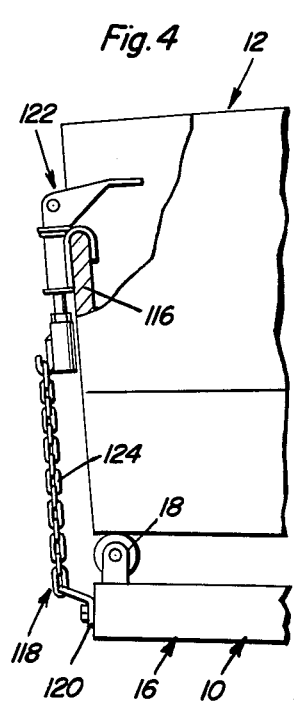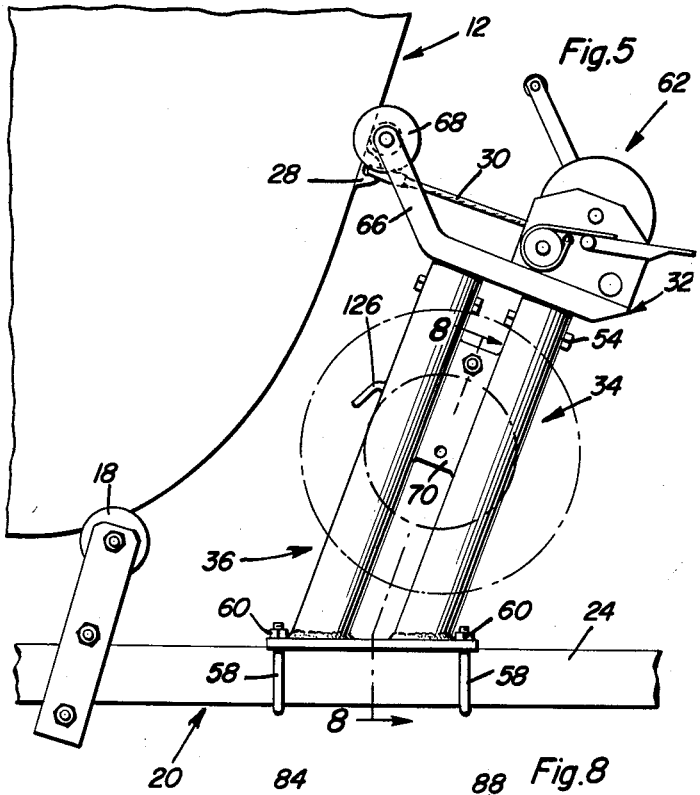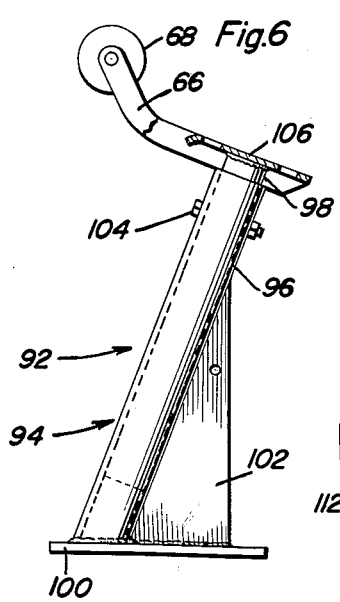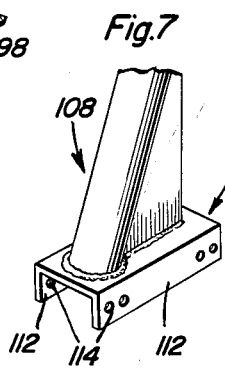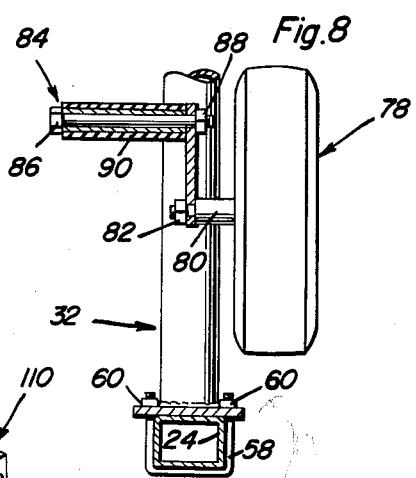
Verlie A. Balko
Sigmund R. Gram
INVENTORS 
United States Patent Office 3,077,998  
Patented Feb. 19, 1963

3,077,998  
BOAT TRAILER CONSTRUCTION  
Verlie A. Balko and Sigmund R. Gram, Ladysmith, Wis., assignors to Balko, Incorporated, Ladysmith, Wis., a corporation of Wisconsin  
Filed Aug. 19, 1960, Ser. No. 50,730  
8 Claims. (Cl. 214—85.1)

This invention relates to a novel and useful boat trailer construction and more particularly to a boat trailer construction specifically adapted to provide means for preventing upward vertical movement of the bow of a boat as well as forward movement of a boat positioned on the trailer so that in the event the trailer and its towing vehicle are braked to a sudden stop, the boat positioned on the trailer will not have a tendency to ride up and over the usual bow stop assembly provided on boat trailers for preventing forward longitudinal movement of a boat positioned on the trailer.

Conventional boat trailer construction includes the provision of a supporting frame having supporting members thereon for supporting the undersurfaces of a boat and an upright bow stop mast assembly carried by the forward portion of the boat trailer for engagement by the bow of a boat positioned on the trailer for preventing forward movement of the boat on the trailer as it is being trailed. Conventional boat trailers are provided with winch means for engagement with one end of a line whose other end is connected to a forwardly projecting bow eye of a boat positioned on the trailer and the winch and line are used to move the boat into engagement with the stop member on the bow stop mast assembly in order to insure that the boat will not be able to move longitudinally of the trailer as it is being trailed. However, most conventional types of boat trailers utilize a winch having a drum over which the free end of the winch line is disposed and therefore, although a means is provided for preventing straight forward horizontal movement of the bow of the boat while it is being trailed, it is possible for the boat to ride up and over the bow stop member. Some types of boats in fact are provided with quite sharply inclined forward bow surfaces and it is difficult with this type of boat construction for the winch line to be tensioned sufficiently without the bow of the boat being raised from its supporting members on the trailer as the sharp inclination of the bow and the forward pull of the winch line tends to cam the bow of the boat up and over the bow stop member.

Additionally, in some instances a boat trailer is not quite long enough to extend rearwardly to the transom of the boat positioned thereon and therefore the tie-down members utilized to secure the stern of the boat against vertical movement relative to the boat trailer inclines forwardly at its lower end for securement to the boat trailer. In this instance, the stern tie-down members are useless in preventing forward movement of the boat longitudinally of the trailer. Of course, if the boat trailer frame extends rearwardly of the transom of the boat positioned thereon, the tie-down members used to secure the stern of the boat to the trailer may be downwardly and rearwardly inclined which inclination will tend to prevent forward movement of the boat on the boat trailer. However, sufficient tensioning of tie-down means inclined relative to a vertical plane to apply the desired amount of vertical pull on the stern of a boat usually results in the tie-down means being over tensioned and thus weakens the same.

It is the main object of this invention to provide an upright bow stop mast assembly for a boat trailer which will cooperate with the winch line and the bow eye of the boat to which the line is secured in a manner whereby the winch line will not only provide a means for preventing rearward movement of the boat on the boat trailer but also upward vertical movement of the bow of the boat relative to the boat trailer.

A still further object of this invention, in accordance with the preceding object, is to provide an upright bow stop mast assembly which may be readily adjusted longitudinally of a boat trailer in order to insure that the transom of the boat will be positioned vertically above a portion of the boat trailer to which stern tie-down means may be secured.

A still further object of this invention, in accordance with the preceding objects, is to provide an upright bow stop mast assembly having stop means on the upper end of the mast assembly adapted to engage a portion of the bow of a boat on a trailer and including horizontal guide means under which the bow eye of a boat and the adjacent end of a winch line may be positioned in order to prevent upward vertical movement of the bow of the boat relative to the boat trailer.

A still further object of this invention is to provide an upright bow stop mast assembly which may be readily extended vertically and retained in adjusted position so as to provide a bow stop mast assembly which may be readily adapted for various heights of bow eyes of boats positioned on the trailer.

An ancillary object of this invention is to provide an upright bow stop mast assembly having means thereon adapted to conveniently support a spare tire and wheel for the boat trailer.

A further ancillary object of this invention is to provide a bow stop mast assembly provided with a laterally projecting and horizontally disposed handle portion positioned at a convenient height above the frame of the trailer whereby the forward end of the trailer may readily be lifted into and out of engagement with the draft vehicle of the trailer.

A final object to be specifically enumerated herein is to provide a bow stop mast assembly which will conform to conventional forms of manufacture, be of simple construction and easy to use so as to provide a device that will be economically feasible, long lasting and relatively simple in operation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a perspective view of the bow stop mast assembly of the instant invention shown mounted upon a boat trailer which is connected to the rear portion of a draft vehicle, a boat being shown positioned on the boat trailer and the winch line of the bow stop mast assembly being shown secured to the bow eye of the boat;

FIGURE 2 is a vertical sectional view of the bow stop on somewhat of an enlarged scale and taken substantially upon a plane passing through the longitudinal center line of the bow stop assembly;

FIGURE 3 is a top plan view of the bow stop mast assembly, parts thereof being removed;

FIGURE 4 is a side elevational view of the rear portion of a boat trailer showing the manner in which the stern of a boat positioned thereon should be tied down to the boat trailer when using the bow stop mast assembly of the instant invention for engagement with the bow of the boat;

FIGURE 5 is a side elevational view of a forward portion of the boat trailer showing the manner in which the bow stop mast assembly may be mounted on the boat trailer and utilized to prevent forward longitudinal movement of the boat and upward vertical movement of the bow of the boat;

FIGURE 6 is a side elevational view of a modified form of a bow stop mast assembly;

FIGURE 7 is a fragmentary perspective view of the lower portion of the modified form of bow stop assembly illustrated in FIGURE 6 of the drawings; and FIGURE 8 is a transverse vertical sectional view taken substantially upon the plane indicated by the section line 8—8 of FIGURE 5.

Referring now more specifically to the drawings the numeral 10 generally designates a boat trailer on which there is disposed a boat generally referred to by the reference numeral 12. The boat trailer includes running gear assembly generally referred to by the reference numeral 14 depending from the frame of the trailer, generally designated by the reference numeral 16, and hull supporting members 18 for supporting the undersurfaces of the boat 12. The frame 16 includes a forward frame portion generally referred to by the reference numeral 20 adapted for securement to the draft vehicle 22 and the forward portion 20 of the frame 12 includes a longitudinally extending box beam 24.

The boat 12 includes a forwardly and upwardly inclined bow 26 having a bow eye 28 projecting forwardly therefrom to which the rear end of a winch line 30 is secured.

The bow stop mast assembly of the instant invention is generally designated by the reference numeral 32 and includes a pair of spaced parallel mast members generally designated by the reference numerals 34 and 36. The mast members 34 and 36 each include a pair of telescopingly engaged mast elements 38 and 40. The lower ends of the lower mast elements 38 are fixedly secured to a base plate 42 in any convenient manner such as by welding 44 and the upper ends of the mast elements 40 are secured to a winch plate 46 in any convenient manner such as by welding 48. The mast elements 40 have their lower ends received within the upper ends of the mast elements 38 and the mast elements 38 are provided with aligned apertures 50 registrable with a selected pair of the pairs of aligned apertures 52 formed in the mast elements 40 whereby the mast assembly 32 may be secured in adjusted extended positions by means of the pair of fasteners 54 secured through aligned pairs of apertures 50 and 52 in each of the mast members 34 and 36.

With particular attention now directed to FIGURES 3 and 5 of the drawings, it will be noted that the base plate 42 is provided with a plurality of pairs of longitudinally spaced and transversely aligned apertures 56 and that the free ends of suitable U-bolt clamps 58 are secured through selected pairs of the apertures 56 by means of fasteners 60 with the U-bolt clamps 58 embracing the box beam 24. In this manner, it may be readily appreciated that the mast assembly 32 may be selectively positioned longitudinally of the box beam 24 as desired.

The winch mounting plate 46 has a winch assembly generally referred to by the reference numeral 62 secured thereto by means of suitable fasteners (not shown) secured through the apertures 64 formed in the winch mounting plate 46. The winch mounting plate 46 also includes a pair of rearwardly and upwardly inclined support arms 66 between whose free ends a V-roller 68 is rotatably mounted for movement about a horizontal axis.

The forward end of the winch line 30 is wound about the drum (not shown) of the winch assembly 62 and the rear end of the line 30 extends rearwardly from the undersurface of the drum.

The mast members 34 and 36 are also interconnected between their upper and lower ends by means of a brace plate 70 rigidly secured between the confronting surfaces of the lower mast elements 38 in any convenient manner such as by welding 72. In this manner, an extremely rigid mast assembly is provided and it will further be noted that the brace plate 70 is provided with a pair of apertures 74 and 76. A spare tire assembly generally referred to by the reference numeral 78 is provided with an axially extending mounting screw 80 whose free end is secured through the apertures 74 by means of a fastener 82. The aperture 76 is utilized to secure one end of a handle assembly generally referred to by the reference numeral 84 to the mast assembly 32 by means of one end of an axle pin 86 which is secured through the aperture 76 by means of fastener 88 and upon which a cylindrical handle member 90 is rotatably mounted.

With attention now directed more particularly to FIGURES 6 and 7 of the drawings there will be seen a modified form of mast assembly generally referred to by the reference numeral 92 which includes a single mast member generally referred to by the reference numeral 94 comprising a pair of telescopingly engaged mast elements 96 and 98. The mast assembly 92 also includes a base plate which is designated by the reference numeral 100 and is similar to the base plate 42. However, inasmuch as the mast assembly 92 includes only a single mast member 94, a triangular bracing plate 102 is secured between the forwardly inclined surfaces of the mast member 94 and the adjacent surface of the base plate 100. The mast elements 96 and 98 are provided with apertures (not shown) similar to apertures 50 and 52 which enable the mast member 94 to be secured in adjusted extended positions by means of fastener 104. Additionally, the mast assembly 92 is provided with a winch mounting plate 106 which is substantially identical to the winch mounting plate 46.

With attention now directed to FIGURE 7 in particular, there is seen a modified form of a single mast assembly generally referred to by the reference numeral 108 which is identical in all respects to the mast assembly 92 with the exception of its base plate which is generally designated by the reference numeral 110 and includes a pair of opposite side down-turned flanges 112 which flanges are provided with pairs of aligned apertures 114 for securing the mast assembly 108 to the box beam 24 by means of suitable fasteners (not shown) secured through the apertures 114 and suitably aligned horizontal apertures (not shown) formed in the box beam 24.

In operation the mast assemblies 32, 92 and 108 are each to be positioned longitudinally on the box beam 24 so as to enable the bow 26 of the boat 12 to abut against the roller 68 while the transom 116 of the boat is positioned substantially over the portion of the boat trailer frame 16 to which the stern tie-down means generally designated by the reference numeral 118 is to be secured as at 120, see FIG. 4. Although the tie-down means 118 does not comprise a part of the instant invention it is to be noted that it includes a cam assembly generally referred to by the reference numeral 122 for adjustably tensioning the chain 124 in order to firmly secure the stern of the boat 12 on the trailer 10 against upward vertical movement. It is to be noted that the tie-down chain 124 is disposed substantially vertically in order to insure that a substantially vertical pull on the transom 116 of the boat 12 will be effected.

With attention now directed more particularly to FIGURE 5 of the drawings, it will be noted that the bow eye 28 to which the rear end of the winch line 30 is secured is received between the outer flanges of the V-roller 68 and immediately below the central diametrically reduced portion of the roller 68 and that the rear end of the winch line 30 also passes immediately beneath the central diametrically reduced portion of the roller 68 and between the support arms 66. It may thus be readily appreciated that the boat 12 has its stern securely fastened to the trailer frame 16 and that the bow 26 is prevented against forward movement relative to the mast assembly 32 by means of the roller 68 and also that the roller 68 provides a means whereby the bow 26 is restricted against upward movement relative to the boat trailer frame 16. Thus, should the towing or draft vehicle 22 and the trailer 10 be brought to an abrupt stop, the natural tendency of the bow 26 to ride up and over the roller 68 will be prevented by the bow eye 28 and the winch line 30 passing beneath the horizontally disposed diametrically reduced center portion of the roller 68.

It is to be noted that either of the mast assemblies may readily be extended in order to compensate for boats having bow eyes of various elevation.

If it is desired, an additional tie-down member 126 may be provided on the mast assembly 32 and may be utilized for securement of one end of an additional tie-down line to the boat trailer 10.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. In a boat trailer of the type having a support frame with supporting members thereon for supporting the undersurfaces of a boat and a forwardly projecting portion for securement to a draft vehicle, an upright bow stop mast assembly, means securing the lower end portion of said mast assembly to said forward frame portion, a mounting plate carried by the upper end portion of said mast assembly, winch means carried by said plate and including a winding drum about which one end of a line is wound, stop means on the upper end of said mast assembly projecting rearwardly of the latter and adapted to engage a portion of the bow of a boat on said trailer, said stop means including horizontal guide means under which the rear free end of said line extends, said stop and guide means comprising a pair of laterally spaced support arms supported from and projecting rearwardly from the upper portion of said mast assembly, a stop and guide roller rotatably supported between and by the free ends of said support arms for rotation about an axis extending between said arms and being positioned in elevation relative to said support frame so as to be adapted to closely overlie the forwardly projecting bow eye of a boat positioned on said trailer and the rear free end of said line passing between said arms when said line is secured to said bow eye in taut condition whereby said stop and guide means will, in addition to preventing forward movement of said boat, also prevent elevation of the bow of the boat relative to said frame.

2. The combination of claim 1 wherein said securing means for the lower end portion of said mast assembly includes means for adjustably positioning the latter longitudinally of said forward frame portion.

3. The combination of claim 1 wherein said mast assembly is extensible and includes means for selectively retaining said mast assembly in adjusted extended positions whereby said stop and guide means may be adjusted vertically relative to said frame to compensate for different heights of the bow eyes of boats positioned on said trailer.

4. The combination of claim 1 including a substantially horizontally disposed and laterally projecting handle on said mast assembly.

5. The combination of claim 1 wherein said mast assembly includes a base plate adapted to conform to the upper contour of a longitudinally extending member of said forward frame portion, said securing means comprising clamp means carried by said base for clampingly engaging said longitudinal member at points spaced longitudinally therealong.

6. The combination of claim 1 wherein said stop roller lies in a horizontal plane above a horizontal plane containing the point at which said line is operatively wound around said drum.

7. The combination of claim 1 wherein said mast assembly includes a mast member comprising a pair of upstanding telescopingly engaged mast elements and means for selectively retaining said elements in adjusted extended positions relative to each other.

8. The combination of claim 1 wherein said mast assembly includes a pair of spaced parallel mast members each comprising a pair of upstanding telescopingly engaged mast elements, means rigidly interconnecting the upper ends of one corresponding pair of elements and means rigidly interconnecting the lower ends of the other pair of corresponding elements together, and means for selectively retaining said one and other pairs of elements in adjusted extended positions.

References Cited in the file of this patent

UNITED STATES PATENTS

| | | |
|---|---|---|
| 2,776,769 | McDonald | Jan. 8, 1957 |
| 2,818,188 | Hooten | Dec. 31, 1957 |
| 2,834,492 | Roy et al. | May 13, 1958 |
| 2,965,252 | Morsch | Dec. 20, 1960 |